United States Patent [19]

Owada et al.

[11] 4,381,530

[45] Apr. 26, 1983

[54] MOVABLE TAPE GUIDE DEVICES FOR USE IN HELICAL-SCAN VIDEO TAPE RECORDERS

[75] Inventors: Nobuyoshi Owada, Kodaira; Tamotsu Tominaga, Akishima, both of Japan

[73] Assignee: Hitachi Denshi Kabushiki Kaisha, Tokyo, Japan

[21] Appl. No.: 173,275

[22] Filed: Jul. 29, 1980

[51] Int. Cl.³ .................... G11B 15/60; G11B 5/08
[52] U.S. Cl. ............................. 360/130.23; 360/83; 360/84
[58] Field of Search ............... 360/130.2, 130.23, 83, 360/84, 130.24, 130.21

[56] References Cited

U.S. PATENT DOCUMENTS

| | | | |
|---|---|---|---|
| 2,885,485 | 5/1959 | Eigen | 360/83 |
| 3,388,221 | 6/1968 | Johnson | 360/83 |
| 3,898,693 | 8/1975 | Chang | 360/84 |
| 4,264,937 | 4/1981 | Kabacinski | 360/130.23 |

*Primary Examiner*—Robert M. Kilgore
*Attorney, Agent, or Firm*—Thompson, Birch, Gauthier & Samuels

[57] ABSTRACT

In a helical scan type video tape recorder, a tape guide is moved toward and away from a head drum of the recorder. The tape guide is reciprocated by a slider moved in a groove by a lever loosely connected to the slider. A stop member is provided for preventing the slider from moving beyond a limit, and a detector is provided to detect a position of the slider for controlling the lever. Spring means are connected to the lever for applying a predetermined pressure to the stop member when the slider is stopped by the stop member.

10 Claims, 5 Drawing Figures

4,381,530

MOVABLE TAPE GUIDE DEVICES FOR USE IN HELICAL-SCAN VIDEO TAPE RECORDERS

BACKGROUND OF THE INVENTION

This invention relates to a movable tape guide device especially suitable for use in an inclined or helical-scan type magnetic recording and reproducing device or a helical-scan type video tape recorder.

As disclosed, for example, in U.S. Pat. No. 3,388,221 to Delmar R. Johnson et al. dated June 11, 1968, in a helical-scan type video tape recorder, for the purpose of controlling the tape wrapping angle of a magnetic tape, two tape guide members are disposed adjacent to a head drum.

Especially in a video tape recorder of the type standardized pursuant to the Society of Motion Picture and Television Engineers Inc. (SMPTE-C), since the tape is wrapped about the entire periphery of the head drum, i.e. for 344° (known as Omega wrap) the two tape guide devices are extremely closely disposed not only to the head drum but also relative with each other. For example, the spacing between the tape guide devices and the head drum is about 0.2 mm and that between the two tape guide devices is about 1.5 mm. For this reason, it is extremely difficult to wrap the tape about the head drum at the time of loading the tape, which is one of the disadvantages of the prior art video tape recorders of the type described above. The detail of the SMPTE-C type is described in a David K. Fibush paper entitled SMPTE Type C Helical-Scan Recording Format, SMPTE, Vol. 87, pages 755-760, Nov. 1978.

As disclosed in Japanese Patent Publication No. 25243/1978 dated June 26, 1978 (inventor Nagata), when the tape guide devices are moved away from the head drum, the tape can be readily wrapped, for facilitating interchange of video tape, but it is necessary to make very small the spacing between the tape guide devices and the head drum, 15 microns, for example. Accordingly, it is difficult to construct the tape guide devices to be movable and when the tape guide devices are constructed to be movable, high accuracy of machining of the component parts is necessary, thus increasing the cost of manufacturing.

SUMMARY OF THE INVENTION

Accordingly, it is an object of this invention to provide an inexpensive movable tape guide device of a simple construction, yet having a high positional accuracy.

Another object of this invention is to provide a movable tape guide device capable of facilitating loading of a magnetic tape in a helical scan type video tape recorder driven by an electric motor, and of decreasing torque of the motor.

Still another object of this invention is to provide an improved movable tape guide device that can reduce wear of moving parts thus ensuring high positional accuracy over a long time.

According to this invention, these and further objects can be accomplished by providing a movable tape guide device comprising a tape guide, a slider supporting the tape guide, guide means for guiding reciprocating motion of the slider, drive means for reciprocating the slider, stop means for preventing the slider from moving beyond a predetermined limit, detecting and controlling means responsive to a position of the slider for controlling the drive means, and spring means for applying a predetermined pressure to the stop means when the slider is stopped by the stop means.

In a preferred embodiment of this invention an electric circuit is provided for an electric motor for driving a magnetic tape of a video tape recorder so as to start and stop the motor in accordance with a selected mode of operation of the tape recorder.

DESCRIPTION OF THE PREFERRED EMBODIMENT

Figure 1:
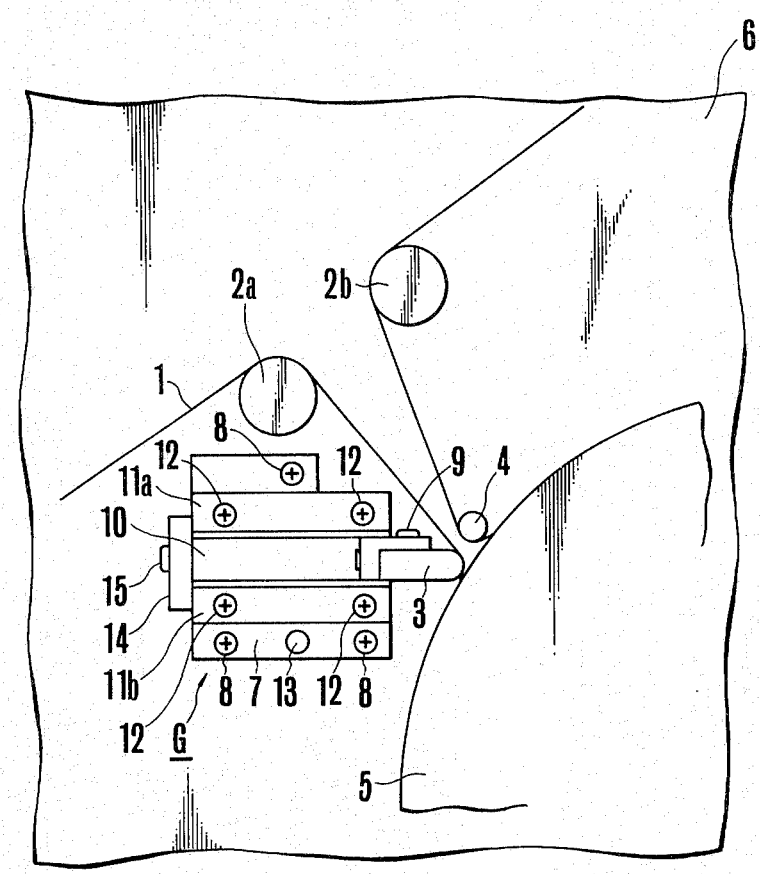
FIG. 1 is a plan view showing one example of a movable tape guide device embodying the invention.
Figure 2:
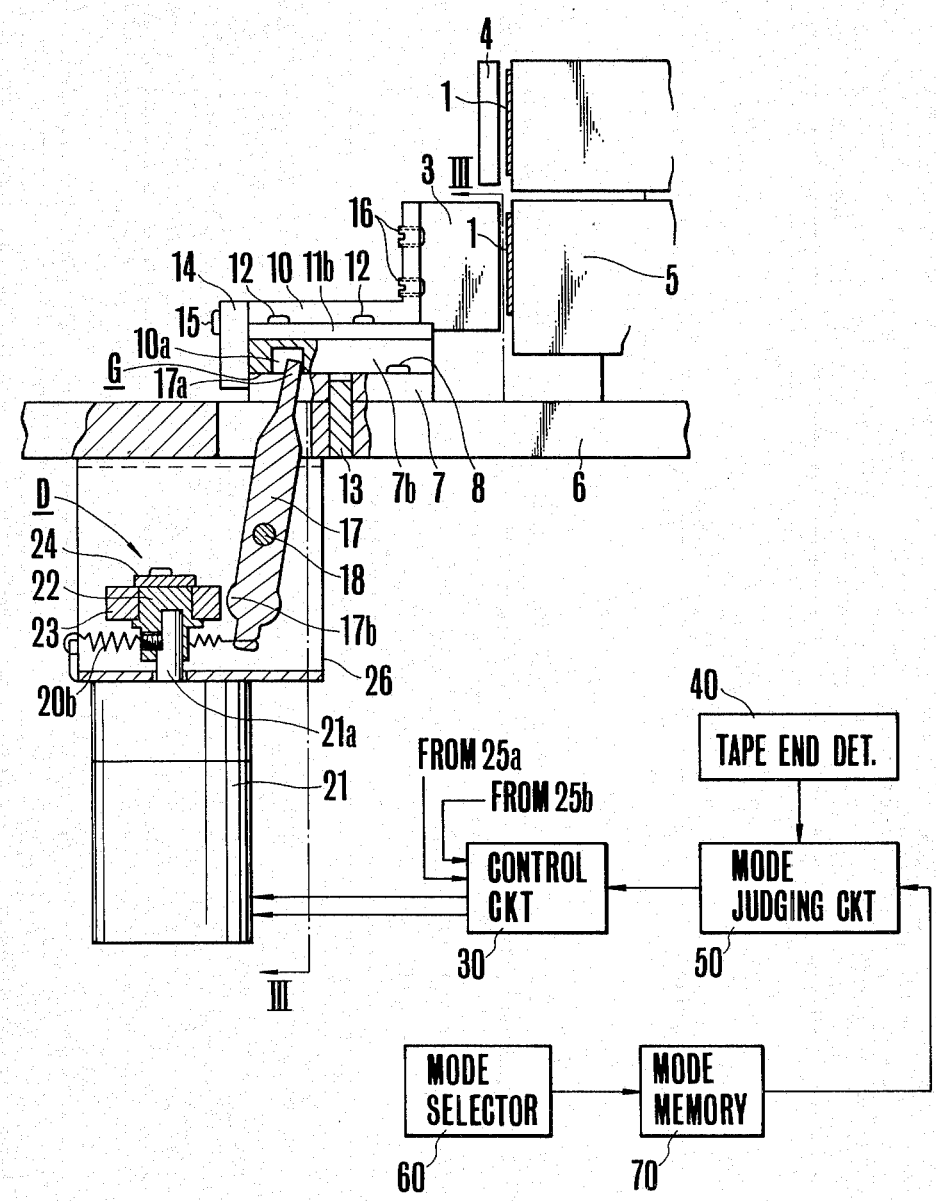
FIG. 2 is a side view, partly in section, showing the movable tape guide device shown in FIG. 1 together with a block diagram of an electric circuit associated therewith.

In a preferred embodiment of the movable guide device shown in FIG. 1, a magnetic tape 1 payed out from a supply reel, not shown, is helically wrapped about a head drum 5 after passing around a guide roller 2a and a tape guide device 3, and then taken up by a take up reel, not shown after passing around the tape guide device 4 and a guide roller 2b. As shown in FIGS. 1 and 2, the tape drive system described above is mounted on a deck or base plate 6. More particularly, a base 7 is secured to the deck 6 by screws 8 and a slider 10 to which the tape guide 3 is secured by screws 9 is mounted on the base 7 to be movable in the horizontal direction. Guide plates 11a and 11b are fixed to the upper surface of the base 7 by screws 12 so as to prevent the slider 10 from moving upwardly. There is also provided a guide pin 13 secured to the deck 6 for accurately positioning the base 7 on the deck 6 and a stop member 14 is secured to the slider 10 with a screw 15 for limiting the rightward movement of the slider 10. Thus, the stop member 14 is positioned at a position such that when it engages the end surface of the base 7 to stop the rightward movement of the slider 10, the tape guide 3 will have a predetermined gap between it and the head drum 5. FIG. 1 shows the tape guide 3 in the tape running position. Although not shown in FIG. 1, a lever and drive means for driving the slider are provided beneath the deck 6.

Figure 3:
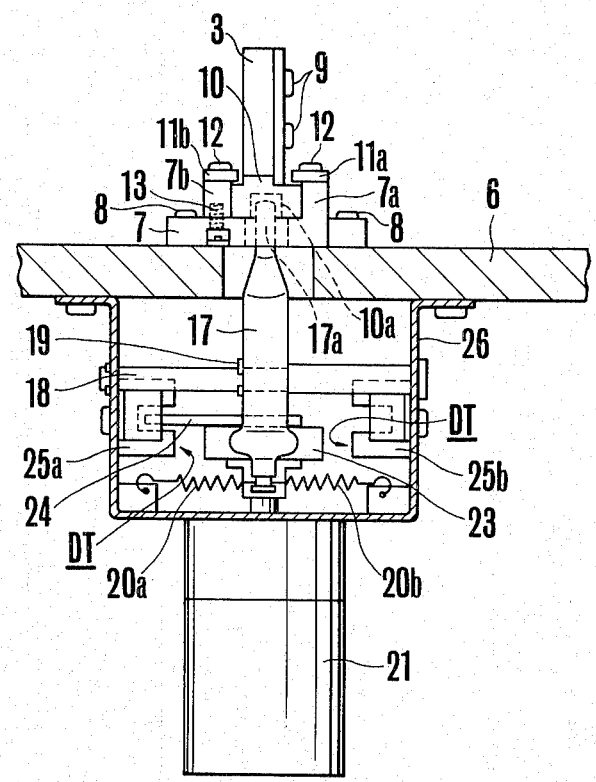
FIG. 3 is a sectional view taken along a line III—III in FIG. 2.

In a SMPTE-C type shown in FIG. 2 the tape guide 3 on the tape supply side is located close to the deck 6, whereas the tape guide 4 on the take up side is located about 20 mm above the tape guide 3. With this construction, as it is more difficult to thread the tape through the gap between the lower tape guide 3 and the head drum 5, in this embodiment the tape guide is constructed to be movable. As shown in FIG. 3, the base 7 is provided with upright side plates 7a and 7b having opposing wall surfaces and guide plates 11a and 11b are secured to the upper of the side plates surfaces to project slightly inwardly. The side plates 7a, 7b and guide plates 11a and 11b define a guide groove G which accomodates the slider 10 to be movable in the horizontal direction with a small clearance. As shown in FIG. 2, press screws 16 are threaded through the slider 10 to adjust the inclination of the tape guide 3 with respect to the head drum 5.

An opening 10a is formed at the bottom of the slider 10 to loosely receive a projection lever 17 of a drive 17a of a drive device. The lever 17 is rotatably mounted on a pin 18 extending through the central portion of the lever 17 so as to slide the slider 10 in the guide groove G as the lever 17 is rotated. A lateral projection 17b is formed near the lower end of the lever 17. Stop rings 19 are fitted over the pin 18 for preventing the lever 17 from moving in the axial direction of the pin 18. One ends of springs 20a and 20b are connected to the lower end of the lever 17, the other ends of the springs being secured to a stationary member 26. Thus the lever 17 is biased to rotate in the clockwise direction as viewed in FIG. 2 by these springs 20a, 20b. Even when the slider 10 is moved by the rotation of the lever 17, the slider 10 would be stopped at a predetermined position by the engagement of the stop member 14 against the end surface of the base 7. At this time, the tape guide 3 maintains a predetermined gap with resepct to the head drum 5.

Figure 5:
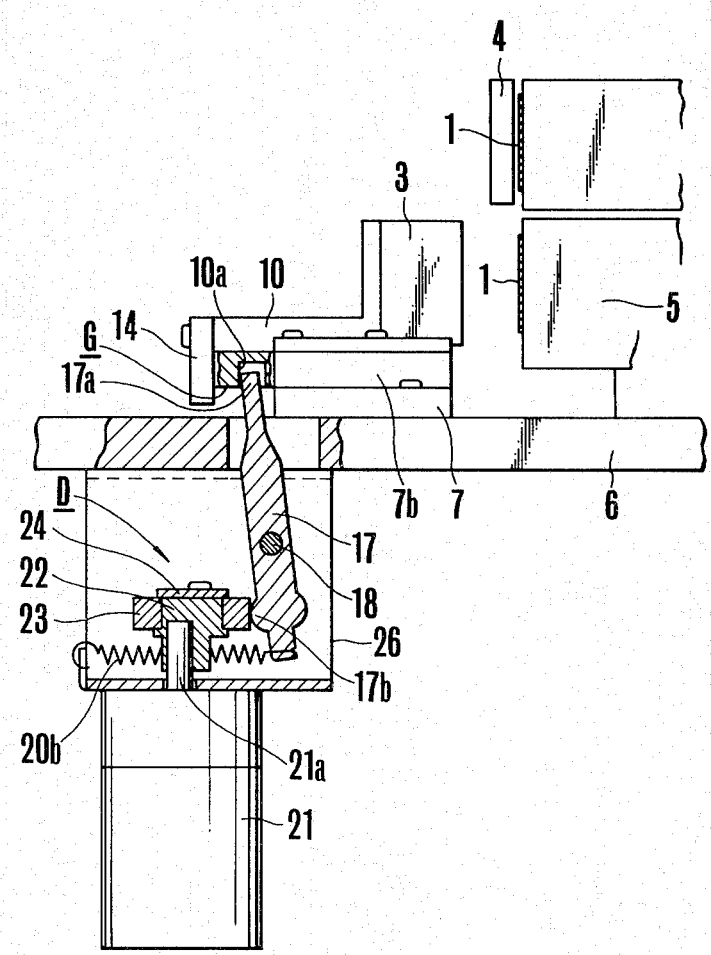
FIG. 5 is side view, partly in section showing the tape guide device in an inoperative position.

As shown in FIG. 5, a boss 22 is excentrically mounted on the shaft 21a of a geared motor 21 and a cam 23 is provided about the boss 22 to constitute a drive unit D acting as an eccentric cam. The cam 23 faces the projection 17b of the lever 17 with a predetermined gap therebetween. In FIG. 2, the eccentric cam 23 is shown in a position most remote from the projection 17b. An arm 24 is secured to the upper surface of the boss 22 and the position of the arm 24 is detected by a pair of opposing photosensitive elements 25a and 25b. As will be described later, since the arm 24 is interlocked with the slider 10 via lever 17, arm 24, photosensitive elements 25a and 25b constitute a position detecting unit DT for detecting the position of the slider 10.

Figure 4:
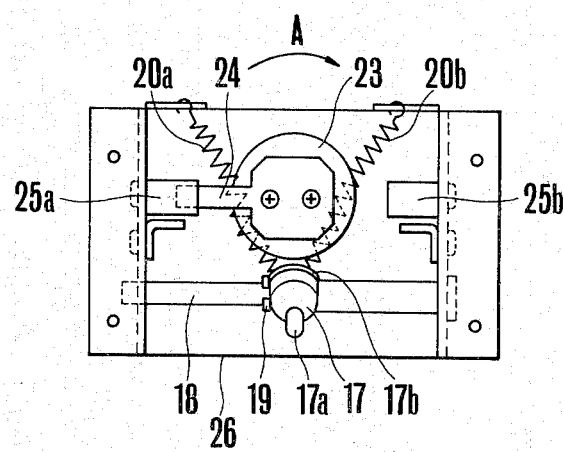
FIG. 4 is a plan view showing a lever driven and a detector.

FIG. 4 is a upper plan view showing the lever 17, the drive unit and the detecting unit, while FIG. 5 is a side view showing a state in which the tape guide 3 is separated from the head drum 5 so that recording and reproduction of the tape are not made.

The apparatus described above operates as follows.

While maintaining the tape guide 3 at a tape operating position, the tape is taken up by a supply reel, not shown, and the tape end is detected by a tape end detector 40 which applies its output to a mode judging circuit 50. The output of the mode judging circuit 50 is sent to a control circuit 30 to drive the geared motor 21, whereby the cam 23 and arm 24 are rotated in the clockwise direction as shown by arrow A in FIG. 4. When the arm 24 rotates about 180° to reach the photosensitive element 25b to cause it to produce an output signal, the control circuit 30 shown in FIG. 2 stops the rotation of the geared motor 21. Due to the eccentric rotation of the cam 23, the projection 17b is urged against the cam 23 to rotate the lever 17 in the counter-clockwise direction in FIG. 2. As a result, the slider 10 is moved to the left by the engagement of the drive projection 17a and the opening 10a and the tape guide 3 is stopped at a position remote from the head drum 5. This state is shown in FIG. 5.

After loading the tape by wrapping it about head drum 5, a mode selector 60 is manually operated to select a stand-by mode out of the content of a mode memory device 70. The selected stand-by mode is sent to the control circuit 30 via the mode judging circuit 50. In this manner, when the video tape recorder is brought to the stand-by state, the control circuit 30 operates to drive the geared motor 21 in the opposite direction whereby the eccentric cam 23 is rotated to move away from the projection 17b. Accordingly, the lever 17 is rotated in the clockwise direction in FIG. 5 by the force of springs 20a and 20b, thus moving the slider 10 to the right. When the stop member 14 engages the end surface of the base 7, the slider 10 is stopped at a position shown in FIG. 2. The rotation of cam 23 is continued until it disengages from the projection 17b. At the same time, the arm reaches the photosesitive element 25a of the detecting unit DT to cause it to produce a signal. This signal is applied to the control circuit 30 to stop the geared motor 21. The control circuit 30 and the detecting unit DT constitute a detection control unit C which controls the drive unit D in accordance with the position of the slider 10.

When the cam 23 is stopped, as it is moved away from the projection 17b and since the drive projection 17a is loosely received in the opening 10a, the rotating motion of the lever is not limited so that the slider 10 is moved by springs 20a and 20b until the stop member 14 engages the end surface of the base 7.

In this embodiment, since the slider 10 is driven only by the force of springs 20a and 20b transmitted thereto through lever 17, it is necessary to energize the geared motor 21 only when the tape guide 3 is moved thereby saving electric power. Moreover, since the motion of the lever 17 is used relatively large movement of the lever 17 can be afforded by a small eccentricity of the cam with respect to the motor shaft 21a thus miniaturizing the construction. Furthermore, as the degree of eccentricity is small, the torque of the geared motor 21 may be small. Moreover, as the slider 10 is received in the gap over a substantial length with a small clearance, the inclination of the tape guide 3 with respect to the head drum 5 can be made to be negligibly small. The drive unit and the guide unit are superposed and interconnected by a lever, so that the space occupied by these units can be reduced. Since the slider 10 and lever 17 are loosely interconnected, even when the slider and the guide unit are precisely machined, the apparatus can operate smoothly. Where the amount of movement of the tape guide is designed to be 10 mm loading of the tape is greatly facilitated, thus reducing the tape loading time to about one half of that of the prior art device. Since a semiclosed U shaped groove is used to guide the slider it becomes possible to increase the contact area and thus decrease the pressure acting thereon. Where the clearance between the slider 10 and the guide groove is designed to be about 10 microns, and when the slider is made of stainless steel and the base 7 and the guide plates 11a and 11b are made of phosphor bronze wear of these elements was not noted after reciprocations of 200,000 times, meaning that the desired accuracy can be maintained over a long time. It was also noted that the tape guide 3 could be returned to the original position with a positional error of only less than 2 microns after operation of 200,000 times. Although in the foregoing embodiment the invention was applied to the lower tape guide 3, it will be clear that the invention is also applicable to the upper tape guide 4.

As above described according to this invention the tape guide is moved by a reciprocating slider operated by a lever it is possible to simplify the construction, reduce the cost of manufacturing and maintain high positional accuracies. Consequently, the movable tape guide device is especially useful for a helical scanning video tape recorder of the SMPTE-C type.

What is claimed is:

1. A movable tape guide device comprising:
   a deck establishing a reference plane;
   a guide for a tape;
   a slider supporting the tape guide;
   guide means supported by the deck for guiding reciprocating motion of said slider which is straightforward and in parallel with the reference plane;
   drive means for reciprocating said slider;
   stop means for preventing said slider from moving beyond a predetermined limit;
   detecting and controlling means responsive to a position of said slider for controlling said drive means; and
   spring means for applying a predetermined force, which is larger than a maximum resultant force in the slider motion direction of the tension forces of the tape acting on the tape guide, to said stop means when said slider is stopped by said stop means.

2. The movable tape guide device according to claim 1 wherein said drive means comprises a lever rotatably supported at a central portion, one end of said lever is loosely connected to said slider and the other end is acted upon by said spring means.

3. The movable tape guide device according to claim 1 wherein said guide means comprises:
   a base;
   a pair of parallel opposed side plates mounted on said base; and
   guide plates secured to the upper ends of said side plates;
   said base, said side plates and guide plates cooperating to define a guide groove for accommodating said slider.

4. The movable tape guide device according to claim 2 wherein said lever is rotated by a cam eccentrically mounted on a motor shaft.

5. The movable tape guide device according to claim 4 wherein when said slider is at a predetermined position, said cam disengages from said lever, so that said slider is operated only by said spring means.

6. The movable tape guide device according to claim 1 wherein said drive means comprises:
   an electric motor; and
   an arm rotated by a shaft of said motor, and wherein said detecting and controlling means comprises a pair of 180° apart photosensitive elements which detect said arm to produce electric signals representing positions of said arm.

7. The movable tape guide device according to claim 6 which further comprises:
   a control circuit which controls said electric motor in response to said electric signals produced by said photosensitive elements;
   a mode selector;
   a mode memory device for producing a mode signal in accordance with a mode selected by said mode selector; and
   a mode judging circuit for operating said control circuit in accordance with said mode signal.

8. The movable tape guide device according to claim 7 which further comprises a tape end detector which applies a signal to said mode judging circuit when one end of a magnetic tape utilized in a helical-scan type video tape recorder reaches a predetermined position.

9. The movable tape guide device according to claim 1 wherein said tape guide is moved toward and away from a head drum about which a magnetic tape of a video tape recorder is helically wraped.

10. A guide device for a tape moving along a first path, comprising:
    a deck establishing a reference plane;
    a slider;
    a tape guide mounted on said slider;
    guide means supported by said deck, said guide means being arranged to guide said slider for reciprocating movement parallel to said plane and along a linear second path between an advanced position at which said tape guide is located adjacent to said first path to guide the tape moving therealong, and a retracted position at which said tape guide is remote from said first path;
    stop means for preventing said slider from moving towards said first path beyond said advanced position;
    spring means for biasing said slider into said advanced position;
    drive means operable during one mode to move said slider against the biasing action of said spring means from said advanced position to said retracted position, said drive means being operable in another mode to permit said slider to return to said advanced position under the biasing action of said spring means; and
    detecting and controlling means responsive to the position of said slider for controlling said drive means.

* * * * *